UNITED STATES PATENT OFFICE.

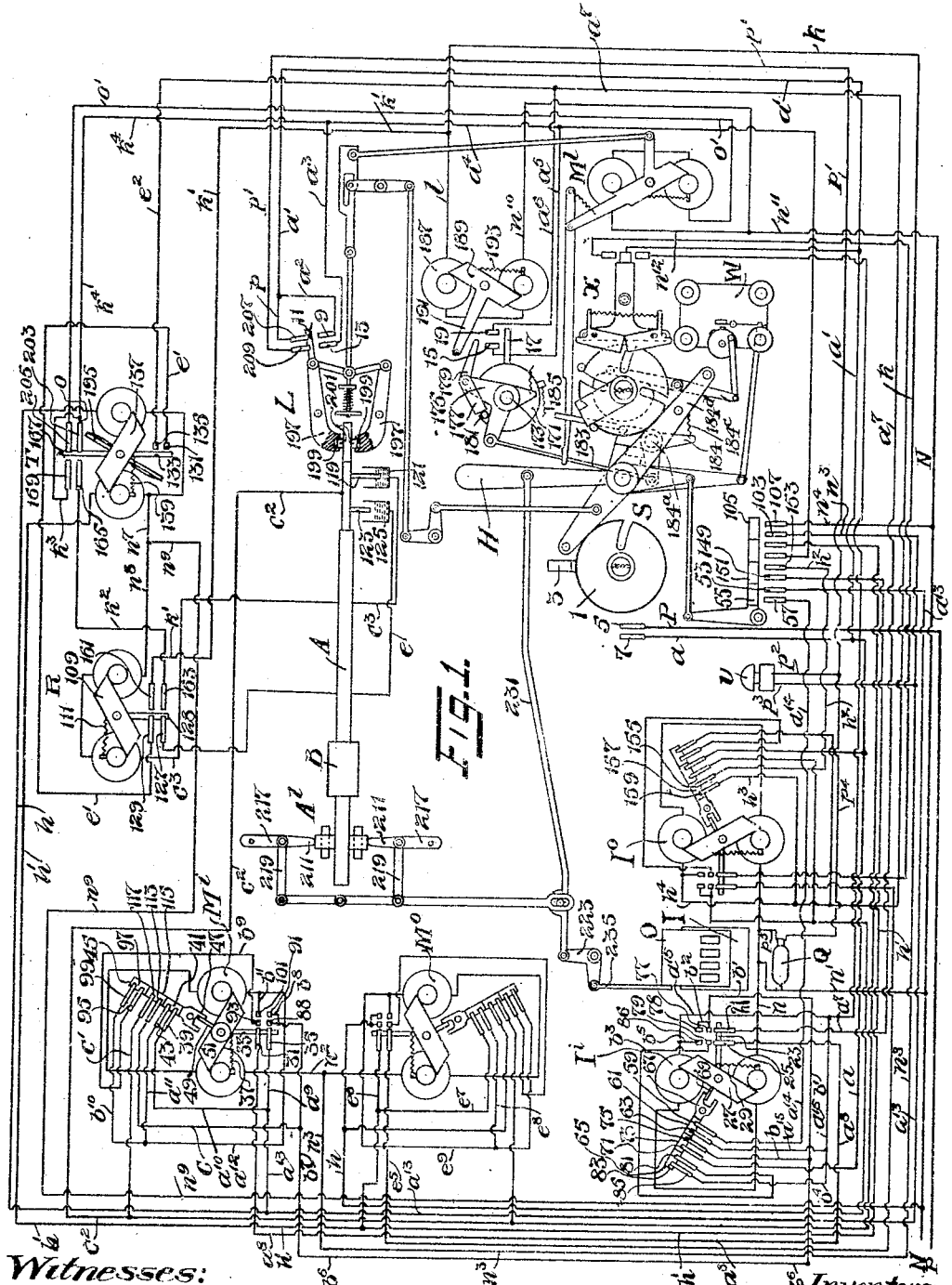

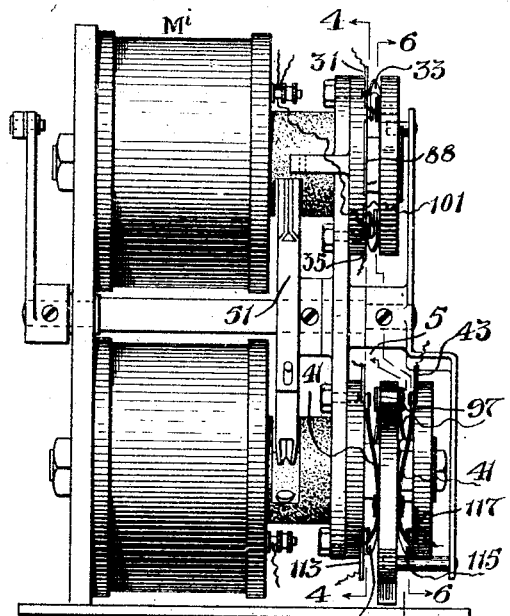
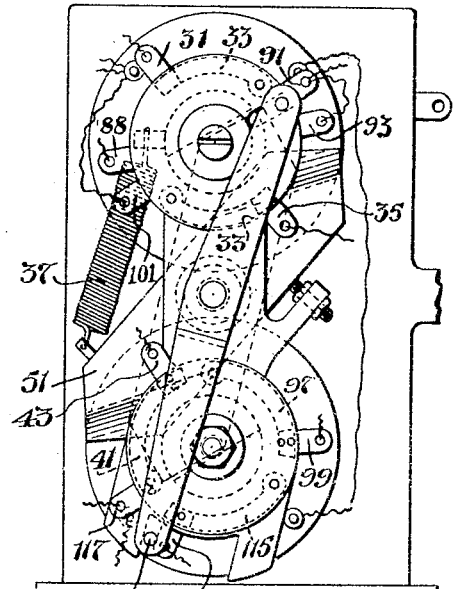
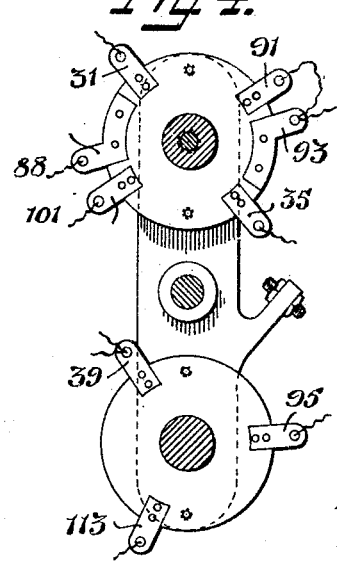
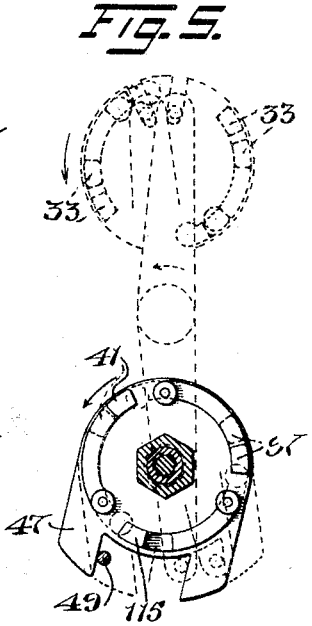

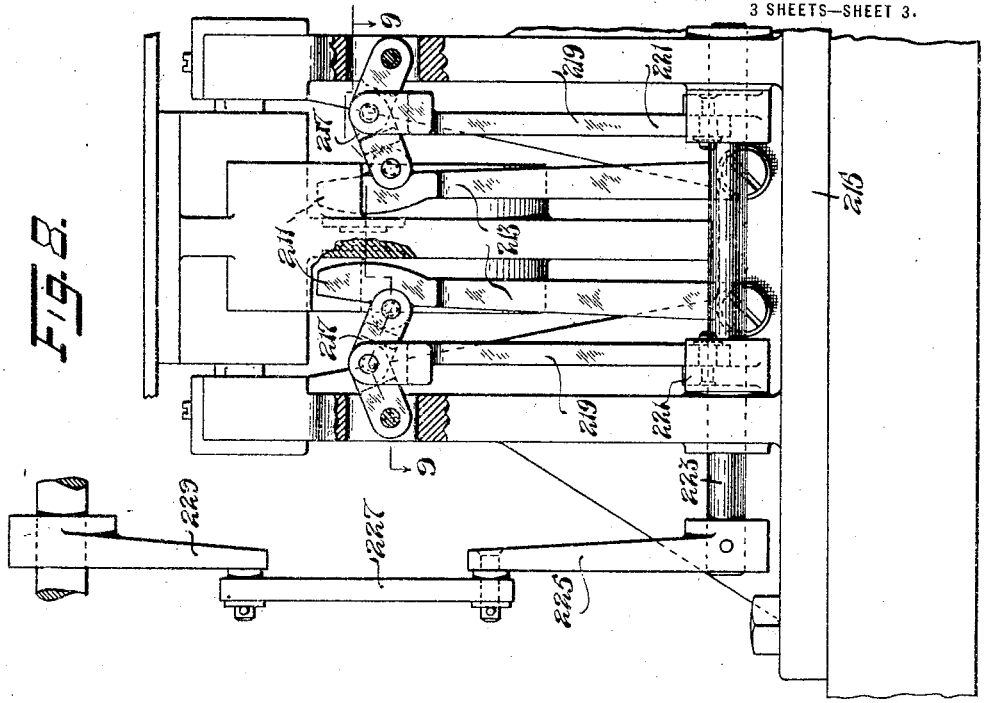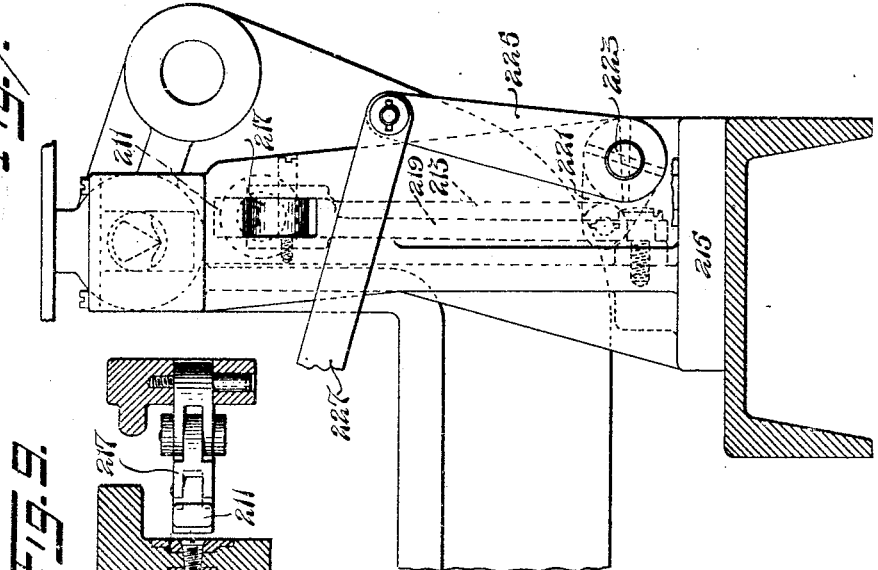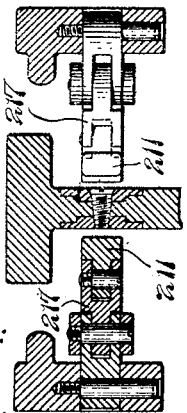

FRANK A. EMERY, OF QUINCY, AND ARTHUR A. ADAMS, OF BROOKLINE, MASSACHUSETTS, ASSIGNORS, BY MESNE ASSIGNMENTS, TO BOSTON SCALE AND MACHINE CO., OF BOSTON, MASSACHUSETTS, A CORPORATION OF MASSACHUSETTS.

WEIGHING-MACHINE.

1,365,094.  Specification of Letters Patent.  Patented Jan. 11, 1921.

Application filed July 26, 1913. Serial No. 781,420.

*To all whom it may concern:*

Be it known that we, FRANK A. EMERY and ARTHUR A. ADAMS, citizens of the United States, and residents, respectively, of Quincy and Brookline, both in the Commonwealth of Massachusetts, have invented an Improvement in Weighing-Machines, of which the following description, in connection with the accompanying drawings, is a specification, like characters on the drawings representing like parts.

This invention relates to weighing machines or scales, and among other objects provides a reliable and effective mechanism whereby a weighing operation once initiated will be automatically completed, and the weight indicated and recorded before another weighing operation can take place. The machine is also constructed and arranged to prevent any fraudulent tampering therewith.

The character of the invention may be best understood by reference to the following description of an illustrative embodiment thereof shown in the accompanying drawings, wherein:

Figure 1 is a diagrammatic view showing the various instrumentalities comprising the weighing machine and electrical connections between them;

Fig. 2 on an enlarged scale is a side elevation of a motor element employed in the machine;

Fig. 3 is an end elevation of Fig. 2;

Fig. 4 is a section taken on line 4—4 of Fig. 2;

Fig. 5 is a section taken on line 5—5 of Fig. 2;

Fig. 6 is a section taken on line 6—6 of Fig. 2;

Fig. 7 on an enlarged scale is a view partly in elevation and partly in section of a beam locating device;

Fig. 8 is an end elevation of the device shown in Fig. 7; and

Fig. 9 is a horizontal section taken on line 9—9 of Fig. 8.

Referring to the drawings and to the embodiment of the invention which is there shown for illustrative purposes, a more ready understanding of the same may be obtained by reference first to the general diagrammatic showing in Fig. 1 wherein there is disclosed a group of instrumentalities with their electrical and other connections. These instrumentalities are represented in said figure in conventional form. Some of the instrumentalities are substantially the same as those shown and described in our copending application, Serial No. 540,937, filed January 31, 1910, and other instrumentalities will be described more fully hereinafter in connection with details thereof shown in the remaining figures of the drawings.

In Fig. 1 there is represented diagrammatically a weighing beam A connected by a usual system of links and levers to the platform of a weighing scale (not shown). On said beam is mounted a poise B which may be advanced inward on the the beam by an in-motor $M^i$ and may be advanced outward on the beam by an out-motor $M^o$. These motors as shown herein are constructed and arranged to transmit to the poise an incremental or step-by-step feed.

To indicate the weight there is provided an indicator or register I driven in a direction corresponding to the in-travel of the poise by a motor $I^i$ and in a direction corresponding to the outward travel of the poise by a motor $I^o$. These also may be step-by-step motors. The in-indicator motor is actuated in synchronism with the in-poise motor, and the out-indicator motor is actuated in synchronism with the out-poise motor.

The circuits to the motors may be controlled by a starting mechanism S for setting the motors in operation for initiating a weighing operation, said starting mechanism being then locked until the completion of the weighing operation.

The poise B may be advanced outwardly on the beam under the step-by-step or beating up action of the out-beam motor until the poise passes beyond the balance point on the beam. Then the beam drops and completes a circuit to a reverse switch R which breaks the circuit to the out-poise and indicator motors and closes a circuit to the in-poise and indicator motors. The poise then travels inwardly back toward and to the balance point.

The beam is slow to rise on the arrival of the poise at the balance point. It is therefore desirable to have the poise approach this point at a slow speed to prevent over travel of the poise beyond the balance point.

To this end the final steps of the poise are controlled by a timing mechanism T which has the dual function of effecting the final steps of the poise at a slow rate and also the making certain that a second weighing operation is not initiated until a predetermined length of time has passed from the time of the arrival of the poise at the position of balance.

To lock the beam when the poise reaches a position of balance there is provided a locking mechanism L which is rendered effective to lock the beam by a motor $M^1$ controlled by the timing mechanism.

To prevent any lateral displacement or objectionable disturbance of the beam from the jarring incidental to the placing of a load on the platform, or other cause, there is provided adjacent the fulcrum of the beam a locating device $A^1$ which prevents any lateral movement of the beam during the intervals between weighing operations, but permits free and unrestricted movement of the beam during the weighing operation.

The weight indicator may be provided with a shutter O which is closed during the weighing operation and opened at the completion of the weighing operation. The reading of this indicator is facilitated by an electric lamp Q. The completion of the weighing operation may be announced by the sounding of a gong U.

To record the reading of the weight indicator I a printing unit W is provided driven in unison with said indicator.

The starting mechanism S is in the main similar to that fully disclosed and described in our said copending application. It is, therefore, unnecessary to describe the same in detail herein, but it will suffice to say that it comprises a main operating handle H which may be thrown to the left (Fig. 1) to initiate a usual weighing operation after being released by a key controlled locking device 1 and also may be operated in connection with an adjusting mechanism X described in said copending application for actuating the indicator motors independently of the poise motors for purposes of calibration.

Having referred in general to the various instrumentalities comprising the weighing machine embodying the invention we will now proceed to describe the circuits and connections whereby the coöperation of said instrumentalities is effected.

The turning of the unlocking device 1 is utilized to connect the machine with an outside source of electricity. To this end said device is provided with a bridge contact 3 for connecting fixed contacts 5 and 7, the former being connected by a main wire P with a suitable source of electricity.

An important feature of the invention relates to the electrical connections between the in-poise motor and the in-indicator motor whereby the armatures of the same rock in synchronism so that for each step of the poise motor there is sure to be a step of the indicator motor. Similar connections are provided for the out-poise and indicator-motors. In effecting a complete step of the armature of one motor each time a step of the other is effected there are provided what may be termed starting, pull-up and hold-up circuits.

The starting circuit comprises a wire $a$ leading from the fixed contact 7, referred to, said wire $a$ being connected by a wire $a'$ with a wire $a^2$ which is connected to a fixed contact 9 at the beam lock, said fixed contact being connected by a bridge contact 11, actuated by the beam lock, as more fully hereinafter described, to a fixed contact 13 connected by a wire $a^3$ with a wire $a^4$, the latter being connected by a wire $a^5$ with a fixed contact 15 at the starting switch. This fixed contact is connected by a bridge contact 17 with a fixed contact 19, the latter being connected by a wire $a^6$ with a wire $a^7$, which in turn is connected to a fixed contact 21 at the in-indicator motor. This fixed contact is adapted to be connected by a switch 23 with a fixed contact 25. Said switch is connected to the armature 27 of the in-indicator motor, said armature being rocked in a contra-clockwise direction on the energization of said motor and in a clockwise direction by a spring 29 on the deenergization of said motor. The fixed contact 25 is connected by a wire $a^8$ with a fixed contact 31 at the in-poise motor, said contact being adapted to be connected by a switch 33 with a fixed contact 35. This switch is turned in a contra-clockwise direction by the armature of said motor on the energization of said motor and in a clockwise direction by a spring 37 on the deënergization of said motor. The fixed contact 35 is connected by a wire $a^9$ with branch wires, one of which leads to the coils of the in-poise motor and the other of which leads to the coils of the in-indicator motor. To connect the wire $a^9$ with the coil of the in-poise motor there is provided a wire $a^{10}$ connected to a fixed contact 39 at the in-poise motor, the latter being connected by a bridge contact 41 with a fixed contact 43. This bridge contact is mounted on an arm 45 having a forked end 47 actuated by a pin 49 projecting from the in-poise motor armature, 51, as more fully hereinafter described. The contact 43 is connected by a wire $a^{11}$ to a wire $a^{12}$, the latter being connected to the coil of the in-poise motor. The wire $a^9$, referred to, is also connected to the coil of the in-indicator motor by a wire $a^{13}$ which leads to a fixed contact 53 adjacent the operating handle H and adapted to be connected by a bridge contact 55, controlled by said handle H, as more fully hereinafter described, with a fixed contact 57. This fixed contact is connected by a wire $a^{14}$ with a fixed contact 59 at the in-indicator motor, said fixed contact being connected by a bridge contact 61 with a fixed contact 63. This bridge contact is mounted on an arm 65 having a forked end 67 coöperating with a pin 69 on the in-indicator armature 27 for rocking said arm, as more fully hereinafter described. The fixed contact 63 is connected by a wire $a^{15}$ with the coils of the in-indicator motor.

When the beam lock actuated switch 11, starting switch 17 and handle controlled bridge contact 55 in the starting circuit are closed, the coils of the in-poise and in-indicator motors will be energized. This will start their armatures to rock thereby moving the switches 23 and 33 out of engagement with the starting circuit fixed contacts coöperating therewith and breaking the starting circuit at each of said motors, as more fully hereinafter described.

We will now describe the pull-up and hold-up circuits for the in-indicator and in-poise motors for continuing the rocking movements of their armatures. To this end the positive wire $a$, referred to, is connected to a fixed contact 71 at the in-indicator motor, said fixed contact being adapted to be connected by a bridge contact 73 on the switch arm of said motor with a fixed contact 75. To this fixed contact is connected a wire $b$ which branches, one branch $b'$ leading to a pull-up fixed contact 77 at the in-indicator motor, said wire $b'$ being connected by a wire $b^2$ with a hold-up fixed contact 78 at said motor. Opposite the pull-up contact is a pull-up fixed contact 79 connected by a wire $b^3$ with a fixed contact 81 adapted to be connected by a bridge contact 83 on the switch arm 65 to a fixed contact 85. This fixed contact is connected by a wire $b^4$ with the wire $a^{15}$, referred to, leading to the coils of the in-indicator motor. Opposite the hold-up contact 78 is a hold-up contact 86 connected by a wire $b^5$ with the wire $a^{15}$ leading to said coils. The coils are connected by a wire $n$ with a wire $n'$ leading to the main negative wire N.

The armature controlled switch arm 23 is adapted to be rocked from the contacts 21, 25 of the starting circuit to the contacts 77, 79 of the pull-up circuit and thence to the contacts 78, 86 of the hold-up circuit. In the course of this movement the positive current supply to the in-indicator motor will be transferred from the starting circuit first to the pull-up circuit and then to the hold-up circuit. It will be observed that each of these three circuits has a bridge contact on the arm 65 so that when this arm is rocked they may all be simultaneously broken. The circuits will not be broken by said arm, however, until the armature reaches nearly to its limit of movement. This is due to the lost motion of the armature pin 69 in rocking from one leg of the fork 67 of the arm 65 to the other leg of said fork.

Having described the pull-up and hold-up circuits for the in-indicator motor we will now describe the pull-up and hold-up circuits for the in-poise motor. To this end the wire $b$, referred to, is connected by a branch wire $b^6$ with a wire $b^7$ connected to a pull-up fixed contact 88 at the in-poise motor, said wire $b^7$ being connected by a wire $b^8$ with a hold-up fixed contact 91 also at said motor. Opposite the pull-up contact 88 is a pull-up contact 93 connected by a wire $b^9$ with a fixed contact 95 adapted to be connected by a bridge contact 97 on the armature actuated arm 45, referred to, with a fixed contact 99. This fixed contact is adapted to be connected by a wire $b^{10}$ with the wire $a^{12}$ which is connected to the coils of the in-poise motor. Coöperating with the hold-up contact 91 is a hold-up contact 101 connected by a wire $b^{11}$ with the wire $a^{12}$ leading to the coils of said motor. The coils of the in-poise motor are connected by a wire $n^2$ with a wire $n^3$ leading to a fixed contact 103 at the handle switch H. This fixed contact is connected by a bridge contact 105 on the handle switch with a fixed contact 107 which is connected by a wire $n^4$ with the main negative line N.

The energization of the coils of the in-poise motor by the starting circuit will initially rock the armature of the motor and with it the switch 33, thereby breaking the circuit at the starting contacts 31 and 33 and making the pull-up circuit at the contacts 88, 93. This continues the energization of the coils and as a result the armature is further rocked toward and to the hold-up contacts 91, 101, thereby making the hold-up circuit at this point. This continues the energization of the coils and marks the completion of the rocking movement of the armature for one step. As the armature nears the completion of its step the pin 49 approaches one of the legs of the fork 47 of the arm 45 and rocks the latter, breaking the starting, pull-up and hold-up circuits at the in-poise motor.

The starting circuits for the in-poise motor and in-indicator motor are in series. Therefore the rocking of either the switch 23 or 33 will break the starting circuit. So if either switch has left its starting circuit contacts another step cannot be initiated until both have returned to their contacts. The pull-up and hold-up circuits for said motors are in parallel. The pull-up and hold-up circuits are not broken by the switch arms 45 and 65 until both armatures have moved a complete step. As a result the armature of the indicator motor must complete a step or rocking movement each time the armature of the poise motor completes a step or rocking movement.

On the completion of the rocking of the armature of each, the circuits are broken and the coils of the motors are deënergized, thereby releasing their armatures to the action of their springs. These retract the switches 23, 33 and cause the same to connect the fixed contacts of the starting circuit and retract the switch arms 45, 65, thereby causing the coils of said motors again to be energized and their armatures to be rocked as before. Thus there is effected a continuous step-by-step action of the armatures.

To transmit movement from the armature of the step-by-step poise motor to the poise there are provided a screw, and pawl and ratchet connections similar to those described in our copending application. Therefore it is not necessary to describe them again herein. To transmit the step-by-step movements of the in-indicator motor armature to the indicator there are provided pawl and ratchet connection similar to those shown and described in our said copending applications. It is also unnecessary to show and describe these here.

The motors for causing the out movement of the poise and indicator and their electrical connections are similar to those described in connection with the in-motors. Therefore it is not necessary to describe the same in detail herein.

The poise is caused by the in-motor to travel inward until the beam rises. This movement of the beam is utilized to automatically shift the feed from the in-motors to the out-motors. We will now describe the reverse motor R and electrical connections thereto for accomplishing this purpose. The reverse motor comprises coils and an armature 109 rocked in one direction on the energization of said coils and urged in an opposite direction by a spring 111 on the deënergization of said coils. The reversing circuit controlled by this armature comprises a wire $c$ tapped from the wire $b^6$, referred to for supplying current to the pull-up and hold-up circuits of the in-motors. The wire $c$ is connected to a fixed contact 113 at the in-poise motor adapted to be connected by a bridge contact 115 on the arm 45 with a fixed contact 117. This fixed contact is connected by a wire $c'$ with branch wires, one of which, $c^2$, leads to and is connected to the beam A. This beam is provided with a long needle contact 119 depending therefrom and coöperating with a mercury cup 121 or other appropriate contact connected by a wire $c^3$ with the coils of the reverse motor. A short needle contact 123 is also provided on said beam depending therefrom and adapted to connect with a mercury cup 125 or other appropriate contact. For convenience these needle contacts are shown in the diagrammatic view Fig. 1 as projecting laterally from the beam, but in practice they of course would depend downward. The cup 125 is connected by a wire $e$ with a fixed contact 127 at the reverse motor connected by the switch 128 of said motor with a fixed contact 129 connected in turn by a wire $e'$ with a fixed contact 131 at the timer. This fixed contact is connected by a switch 133 with a fixed contact 135. Said switch is connected to an armature 137 of said timer motor and is moved by said armature in one direction on the energization of said timer coils and in an opposite direction by a spring 139 on the deënergization of said coils. The fixed contact 135 is connected by a wire $e^2$ with the wire $a^6$ of the starting circuit.

One of the coils of the timer is connected by a wire $h$ with the wire $a^{13}$ of the in-motor circuit and the other coil of the timer is connected by a wire $h'$ with a fixed contact 149 at the starting mechanism, said fixed contact being connected by a bridge contact 151 controlled by the operating handle H with a fixed contact 153. This fixed contact is connected by a wire $h^2$ with a fixed contact 155 at the out-indicator motor, said fixed contact being adapted to be connected by a bridge contact 157 on the forked arm of said motor with a fixed contact 159, this fixed contact being connected by a wire $h^3$ with a wire $h^4$ leading to the coils of the out-indicator motor. The coils of the timer T and reverse switch R are connected respectively by wires $n^7$ and $n^8$ with a wire $n^9$ which leads to the main negative line N. By the circuits described each time either the in or the out-motors are energized to rock their armatures the armature of the timer will be rocked.

The circuit for the out-motor includes a wire $k$ connected to a wire $k'$ connected to a fixed contact 161 at the reverse motor, said fixed contact being adapted to be connected by the switch 128 of said motor with a fixed contact 163 connected by a wire $k^2$ with a fixed contact 165 at the timer T, said fixed contact being adapted to be connected by a switch 167 controlled by the timer armature 137 with a fixed contact 169. This contact is connected by a wire $k^3$ to a wire $k^4$ connected in turn to the wire $a^3$ of the starting circuit.

The rocking of the handle H in initiating a weighing operation is utilized to close the starting circuit switch 17. To this end said switch projects radially from a disk 171 journaled on a shaft 173 which also carries an arm 175 provided with a dog 177 having a trip tail 179. The end of this dog is adapted to engage a pin 181 projecting from a face of said disk 171 and said arm 175 is connected to a link 183, connected to one arm of a bell crank 184 fulcrumed on a pin 184$^a$, the other arm of said bell crank being connected by a spring 184$^c$ to a lever 184$^d$ fast on the shaft of the handle H. When the handle is rocked to the left, through the link, arm, dog and pin described, the disk is rocked contra-clockwise thereby closing the switch 17. A spring 185 urges the disk in the opposite direction.

To trip this switch there is provided a trip motor 187 having an armature 189 provided with a trip arm 191. This armature is urged in a clockwise direction by a spring 193. To energize said motor there is provided a wire 1 shunted from the out-motor circuit wire $k'$, said motor being connected by a wire $n^{10}$ with a wire $n^{11}$ leading to the main negative line N.

It follows that when the out-motor circuit is energized the trip motor 187 will be energized, thereby rocking its armature 189 in a contra-clockwise direction, causing its arm 191 to trip the tail 179 of the dog 177 from the disk pin 181, thereby releasing the disk to the action of its spring 185 and opening the starting circuit.

When the beam is in a position of balance the long needle contact 119 is immersed in the mercury cup 121 and the short needle 123 is out of its mercury cup 125. When the long needle is in its cup the circuit is complete to the coils of the reverse motor R, thereby energizing said motor and holding its switch 128 in position to connect the contacts 127, 129 and complete the circuit for the in-motor. When the operating handle H is thrown to unlock the beam, as more fully hereinafter described to complete the circuits, it follows that the poise will start inward on the beam. The load on the platform of the scale will cause the beam to rise, thereby lifting the long needle contact 119 out of its cup. This will break the circuit to the coils of the reverse motor, thereby de-energizing the same and releasing its armature 109 to the action of its spring 111. This will rock said armature in a contra-clockwise direction and cause the switch 128 to connect the contacts 161, 163 and complete the circuit to the out-motors. Then the poise will travel outward until the beam is caused to tilt downward. This will cause the needle contacts to be immersed in their cups, thereby again energizing the reverse motor, causing the switch 128 to be thrown to a position breaking the out-motor circuit and making the in-motor circuit and starting the in-motors.

The starting circuit was broken by the trip motor 187 at the time the out-motor circuit was completed on the up tilt of the beam. Therefore the in-motors are no longer operated through the starting circuit, but are operated through the short needle contact circuit, completed by the immersion of said needle contact in its cup on the dropping of the beam and by the timer switch 133.

The beats of the in-motors are now controlled by the timer T which is provided with a fan 195 and gearing connections which retard the retreat of the armature while urged by its spring 139 and prevent the connection of the switch 133 with the in-motor circuit contacts 131, 135 until a second has elapsed. Thus the in-beats of the motor are slowly effected at second intervals. This is very important as contributing to accurate weighing since it causes the poise to slowly approach the balance point and prevents the same from traveling beyond said point. When the timer motor is energized on the commencement of a weighing operation its switch 133 will swing contra-clockwise beyond the fixed contacts 131 and 135. As a result when subsequently attracted by its spring 139, the switch 133 approaches said contacts from the right (Fig. 1). The movement of said switch is not sufficient to reach intermittently and connect the fixed contacts 131 and 135 until the timer commences to effect the second beats as described.

The poise will continue to travel in with second beats until it reaches the point of balance, whereupon the beam will rise, thereby lifting the short needle contact from its cup. This will break the circuit to the in-motor and stop further travel of the poise.

The long needle contact, however, will remain in its cup. As a result when the next weighing operation is initiated the circuit to the in-motors will be completed and the initial travel of the poise will be inward until the beam rises.

The lock L for automatically holding the beam after it reaches a position of balance may be similar to that disclosed in our said copending application. There is this difference, however. It has jaws 197 provided with recesses 199 which receive lugs 201 on the sides of the beam and thereby prevent both upward and downward movement of the beam, whereas in our said application merely downward movement of the beam was prevented.

This beam lock is released from the beam by the operating handle H and is rendered effective to lock the beam by the motor M$^1$ under the control of the timer in a manner similar to that disclosed in said application. To energize said motor M$^1$ there is provided a wire $o$ leading from the positive wire $k^4$ to a fixed contact 203 at the timer. This fixed contact is adapted to be connected by the switch 167, referred to as controlled by the armature of the timer, with a fixed contact 205 connected by a wire $o'$ with the coils of said motor M$^1$. These coils are connected by a wire $n^{12}$ with the wire $n^{11}$, referred to as leading to the main negative wire N.

The fixed contacts 203, 205 at the timer are so arranged relatively to the timer switch 167 that the latter in its slow movement, as restrained by its fan, does not connect said fixed contacts until a period of three seconds has elapsed from the time the short needle 123 separates from its cup 125 on the movement of the beam to the balance position. This prevents any possibility of locking the beam until it has come to a position of final balance. After the elapse of three seconds or other appropriate interval, said switch 167 connects said contacts 203, 205, thereby energizing the coils of the motor $M^1$ which renders the lock L effective to grip the beam and hold the same in position until unlocked by the handle H on the commencement of a subsequent weighing operation.

The movement of one of the arms of the lock is utilized to complete a circuit which sounds the gong U announcing the completion of a weighing operation and lights the lamp Q for the indicator. This circuit comprises a wire $p$ leading from the wire $a'$ and connected to a fixed contact 207 at said lock, this fixed contact being adapted to be connected by the bridge contact 11, referred to, on an arm 197 of said lock with a fixed contact 209 which in turn is connected by a wire $p'$ with a wire $p^2$ connected to the gong U, the latter being connected by a wire $p^3$ with the wire $n^3$ leading to the negative wire N. The wire $p'$ is connected by a branch wire $p^4$ with the lamp Q, said lamp being connected by a wire $p^5$ with the wire $n'$ which leads to the negative wire N.

On the automatic locking of the beam the bridge contact 11 will be moved to connect the fixed contacts 207, 209 and complete the circuit to the gong and lamp, sounding the former and lighting the latter.

The beam locating device $A^1$ referred to comprises (Figs. 7, 8 and 9) opposed shoes 211 for engagement with opposite faces of the beam at its fulcrum, said shoes being mounted on arms 213 fulcrumed on a support 215 adjacent said beam. To actuate these arms there are provided toggles 217 connected by links 219 with arms 221 fast on a rock shaft 223. This shaft has an arm 225 connected by a link 227 with an arm 229 on the rock shaft of the handle H. As a result when the handle is thrown to the right on the completion of a weighing operation it will straighten the toggles and clamp the beam between said shoes, thereby preventing any possibility of the dislocation of the latter from its proper position. This movement of the handle is also utilized to open the shutter O to disclose the indicator I. To this end the handle is connected by a link 231 with a bell crank 233 connected in turn to a link 235 which is connected to the shutter O. As a result when the handle is rocked to the right it will lift the shutter and permit the reading of the indicator registration. The rocking of the handle to the right is also utilized to effect the printing by the printing unit W. This printing unit is driven from the indicator by an appropriate shaft (not necessary to be shown herein) so that the registration of the printing mechanism will always be the same as that of the indicator.

In our said copending application a transmitter instrumentality was employed for controlling the in-poise motor and in-indicator motor to cause them to operate with synchronous steps and another transmitter was employed for controlling the out-poise motor and out-indicator motor to cause them to operate with synchronous steps. By the invention described in the present application, for example the in-poise and in-indicator motors have a mutual control which insures the synchronous steps and without the necessity of employing the transmitter instrumentalities. This simplifies the construction and renders the same cheaper to make while retaining all of the advantages of the more complex mechanism disclosed in said copending application.

By the automatic provision for changing the speed of travel of the poise it is possible to give the poise a rapid travel throughout the major part of the weighing operation and reduce the speed merely as the poise approaches the balance point. This enables the weighing operation to be performed in a shorter time than in accordance with the apparatus disclosed in said copending application.

In order to further simplify the apparatus the motor for operating the shutter disclosed in said copending application has been omitted and the shutter is now controlled mechanically by the main operating handle.

It will be understood that the invention is not limited to the specific embodiment thereof disclosed herein but that considerable departure may be made therefrom without departing from the spirit and scope of the invention.

What we claim as new and desire to secure by Letters Patent is:

1. In a weighing machine, the combination of a beam; a poise; and motor means for advancing the latter step-by-step along said beam and having means for automatically reducing the frequency of the steps as the poise approaches the balance point.

2. In a weighing machine, the combination of a beam, a poise, a motor for feeding said poise at one speed, a motor for feeding said poise step-by-step in definite weight units toward the balance point at a reduced speed, and means controlled by the movements of the beam for automatically shifting the feed from one motor to the other.

3. In a weighing machine, the combination with a movable beam, of a poise, and means for feeding said poise along said beam including motor means and electrical connections for automatically reversing the direction of feed after the poise has passed beyond the balance point and for reducing the speed of feed of said poise as it moves reversely prior to movement of said beam toward a position of final balance.

4. In a weighing machine, the combination of a beam; a poise; and means for feeding said poise along said beam including motor means, reverse means and circuits having contacts controlled automatically on the tilting of said beam for energizing said reverse means to cause said motor means to change the direction and speed of feed of said poise.

5. In a weighing machine, the combination of a beam; a poise; and means for feeding said poise along said beam including motor means, reversing means and electrical circuits controlled by said beam for rendering said reversing means effective to act on said motor means and change the direction and speed of feed of said poise.

6. In a weighing machine, the combination of a beam; a poise; motor means for feeding said poise step-by-step along said beam; and means including electrical connections controlled by the tilting of said beam for causing said motor means to effect a reduced step feed of the poise as it approaches the beam balance point.

7. In a weighing machine, the combination of a beam, a poise, motor means, including an oscillatory armature for feeding said poise along said beam; electrical means including circuit means for oscillating said armature at one speed and independent circuit means for oscillating said armature at a different speed.

8. In a weighing machine, the combination of a fulcrumed beam; a poise; motor means for feeding said poise along said beam at different speeds; and electrical circuits for said motor means having contacts on the beam, one of said contacts controlling the changing of the direction of said feed of said motor means and the other of said contacts controlling the changing of the speed of feed of said motor means prior to the movement of the beam toward final balance.

9. In a weighing machine, the combination of a beam; a poise; motor means for feeding said poise along said beam at different speeds; and electrical means for controlling said motor means including circuits having long and short contacts carried by said beam and contacts coöperating with said long and short contacts, whereby tilting of the beam changes the direction and reduces the speed of feed of said motor means.

10. In a weighing machine, the combination of a beam; a poise; step-by-step motor means for feeding the poise along said beam; and a timer mechanism for reducing the speed of feed of the poise in the vicinity of the point of balance.

11. In a weighing machine, the combination of a beam; a poise; motor means for advancing said poise along said beam; and electrical connections and circuits for said motor means including long and short needle contacts depending from said beam; contacts coöperating with said needle contacts; and means connected in said circuits for changing the direction of feed of said motor means on tilt of said beam in opposite directions and reducing the speed of feed of said motor means on the tilt of said beam in one direction.

12. In a weighing machine, the combination of a beam; a poise; a motor for advancing said poise out along said beam; a motor for advancing said poise in along said beam; electrical circuits for said motors including contacts carried by said beam; and feeding speed regulating means for said motors coöperating with said circuit for driving one at a different speed from the other.

13. In a weighing machine, the combination of a beam; a poise; motor means for feeding said poise along said beam; and controlling means for said motor means having provision for reducing the speed of said motor means in feeding the poise toward the balance point; and means governed by said controlling means for locking said beam on the elapsing of a predetermined time interval after the poise reaches said balance point.

14. In a weighing machine, the combination of a beam; a poise; motor means for feeding said poise in along said beam; a motor for feeding said poise out along said beam; electrical means including a pair of circuits for said in-motor, one for feeding the latter at one speed and the other for feeding the same at a different speed; electrical means including a circuit for said out-motor; and contacts controlled by the tilting of said beam for breaking the out-motor circuit and for making the in-motor circuits.

15. In a weighing machine, the combination of a beam; a poise; motor means for feeding the poise along the beam; electrical means including starting and slow speed circuits for said motor means; and contacts in said circuits carried and controlled by said beam for automatically transferring the actuation of said motor means from said starting to said slow speed circuit.

16. In a weighing machine, the combination of a beam, a poise, an indicator, and means for feeding said poise along said beam and operating said indicator, said means having provision for feeding said poise to and beyond the balance point and for automatically reversing and reducing the speed of said poise and indicator as said poise passes beyond the balance point.

17. In a weighing machine, the combination of a beam, a poise, an indicator, means for causing said indicator to register the movements of said poise, and motor means for actuating said poise having provision for feeding said poise to and beyond the balance point, and means for automatically reversing the direction of feed when the poise is beyond said point, and means for changing the speed of said poise prior to movement of the beam toward final balance.

18. In a weighing machine, the combination of a beam; a poise; an indicator for registering movement of said poise along said beam; and motor means for actuating said poise and indicator step by step and having provision for automatically reversing and reducing the speed of the step feed thereof as a condition of final balance is approached.

19. In a weighing machine, the combination of a beam; a poise; an indicator for registering movements of said poise; step-by-step motors for operating said poise and indicator and electrical means including circuits and switches at said motors coöperating for insuring a step feed of one motor for each step feed of the other motor.

20. In a weighing machine, the combination of a beam; a poise; an indicator for registering movements of said poise; step-by-step motors for said poise and indicator; electrical circuits for said motors; and switches in said circuits controlled by the armatures of said motors whereby the circuits of said motors are not broken until each motor has completed a step.

21. In a weighing machine, the combination of a beam; a poise; an indicator for registering travel of said poise along said beam; step-by-step motors for said poise and indicator; and means including electrical connections and switches actuated by said motors whereby the latter have a mutual control insuring a step feed of one for each step feed of the other.

22. In a weighing machine, the combination of a beam; a poise; means for registering movements of said poise; a step-by-step motor for said poise; a step-by-step motor for said register means; and electrical means including starting, pull-up and hold-up circuits for insuring a complete rocking step of the armature of one motor for each rocking step of the armature of the other motor.

23. In a weighing machine, the combination of a beam; a poise; means for causing said poise to travel along said beam; and means for automatically locking said beam on the completion of a weighing operation comprising lugs on said beam and locking arms having recesses for receiving said lugs.

24. In a weighing machine, the combination of a beam; a poise; means for feeding said poise along said beam; a signal; an electric circuit therefor; and means for automatically locking said beam on the completion of a weighing operation, said locking means having provision for automatically completing the circuit to said signal.

25. In a weighing machine, the combination of a beam; a poise; an indicator for registering movements of said poise; means for actuating said poise and indicator; a lamp for said indicator; an electric circuit for said lamp; and means for automatically locking said beam on the completion of a weighing operation, said locking means having provision for automatically completing the circuit to said lamp.

26. In a weighing machine, the combination of a beam; a poise; an indicator for registering movements of said poise; means for operating said poise and indicator; a lamp for illuminating said indicator; a signal for announcing the completion of a weighing operation; an electric circuit for said lamp and signal; and means for automatically locking said beam on the completion of a weighing operation and having provision for automatically completing the circuit to said lamp and signal.

27. In a weighing machine, the combination of a beam; a poise; an indicator for registering movements of said poise; motor means for operating said poise and indicator; a shutter for said indicator; and a starting mechanism for initiating a weighing operation including a handle and connections from said handle to said shutter for opening said shutter on the completion of a weighing operation.

28. In a weighing machine in combination, a beam, a poise, means for advancing said poise step-by-step along said beam, means adapted automatically to lock said beam as the latter reaches the poising point, and means adjacent the fulcrum of said beam for preventing dislocation of the latter during the intervals between weighing operations.

29. In a weighing machine in combination, a beam, a poise, means for advancing said poise step-by-step along said beam, means adapted automatically to lock said beam as the latter reaches the poising point, means adjacent the fulcrum of said beam for preventing dislocation of the latter during the intervals between weighing operations and means manually operative for rendering ineffective said last means and said locking means.

30. In a weighing machine, the combination of a beam; a poise; means for feeding said poise along said beam; and means for engaging opposite sides of said beam simultaneously adjacent its fulcrum for preventing dislocation of said beam on its fulcrum.

31. In a weighing machine, the combination of a beam; a poise; means for feeding the latter along said beam; and means for preventing dislocation of said beam comprising shoes at opposite sides of said beam and means including toggles for adjusting said shoes toward and from said beam.

32. In a weighing machine, the combination of a beam; a poise; means for feeding said poise along said beam; and means for preventing dislocation of said beam comprising shoes at opposite sides of said beam, rocking arms carrying said shoes, toggles, a rock shaft, and links connecting said rock shaft for buckling and straightening said toggles to adjust said shoes toward and from said beam.

33. In a weighing machine in combination, a beam, a poise, means for advancing said poise along said beam, means automatically operative to lock said beam when the poise has arrived at a point of balance, means adjacent the fulcrum of said beam for preventing dislocation of the latter during the intervals between weighing operations and means comprising a single handle manually operative for rendering ineffective said last means and said locking means.

34. In a weighing machine in combination, a beam, a poise, means for advancing said poise step-by-step along said beam, means adapted to lock said beam, and means adjacent the fulcrum of said beam for preventing dislocation of the latter during the intervals between weighing operations.

35. In a weighing machine, the combination of a beam; a poise; motor means for feeding said poise along said beam; a starting circuit for said motor means; a switch in said circuit; an operating handle; connections from said handle to said switch for closing the latter to complete said starting circuit on the initiation of a weighing operation; and motor means for automatically breaking said circuit in the course of a weighing operation.

36. In a weighing machine, the combination of a beam; a poise; an indicator; motor means for said poise and motor means for said indicator; each motor means comprising coils, an armature, a spring urging said armature in one direction, a switch, coöperating elements on said armature and switch relatively movable with lost motion to delay the rocking of said switch until substantially the completion of a rocking movement of said armature; and electric circuits for the motor coils controlled by said switch.

37. In a weighing machine, the combination of a beam; a poise; an indicator; a motor for said poise and a motor for said indicator, each comprising coils, an armature, a spring for urging the armature in one direction, circuits for said coils, a switch arm carrying bridge contacts for completing said circuits, and means actuated by said armature for preventing the rocking of said switch arm to break said circuits until substantially the completion of a rocking step of said armature.

38. In a weighing machine, the combination of a beam; a poise; an indicator; a step-by-step motor for said poise and a step-by-step motor for said indicator, each comprising coils, an armature, and a spring tending to rock said armature in one direction; starting, pull-up and hold-up circuits for said motors, switch contacts in said circuits, and a switch controlled by the armature of each motor for progressive engagement with the starting, pull-up and hold-up contacts.

39. In a weighing machine, the combination of a beam; a poise; an indicator; a step-by-step motor for said poise; a step-by-step motor for said indicator; starting, pull-up and hold-up circuits for said motors fixed contacts in said circuits at each of said motors; a switch movable by each motor for progressively completing the starting, pull-up and hold-up circuits; a switch carrying bridge contacts for each of said circuits at each motor and operable thereby to break said circuits on the completion of step movements by the armature of said motors.

40. In a weighing machine, the combination of a beam; a poise; motor means for advancing said poise along said beam; beam locking means; and timer means coöperating with said motor and having provision for controlling the speed of said motor means and rendering effective said locking means.

41. In a weighing machine, the combination of a beam, a poise, and means for feeding said poise along said beam to and beyond the balance point, and means for automatically returning the poise to the balance point at a slower speed.

42. In a weighing machine, the combination of a beam, a poise, a motor for feeding said poise at one speed, a motor for feeding said poise to the balance point at a reduced speed, and means automatically operative upon movement of the beam for shifting the feed from one motor to the other.

43. In a weighing machine, the combination of a beam, a poise and means for feeding said poise along said beam including motor means, and electrical connections automatically operative upon movement of the beam for reversing the direction of feed of the poise and reducing the speed of feed of said poise toward the balance point.

44. In a weighing machine, the combination of a beam, a poise, an indicator and means for feeding said poise along said beam and operating said indicator, said means having provision for feeding said poise to and beyond the balance point and for automatically reversing the direction and reducing the speed of said poise and indicator upon movement of the beam as said poise passes beyond the balance point.

45. In a weighing machine, the combination of a beam, a poise, an indicator for registering movements of said poise and motor means for actuating said poise and indicator having provision for feeding said poise to and beyond the balance point and for automatically reversing and changing the speed of said poise and indicator upon movement of said beam consequent to the feeding of the poise beyond the balance point.

46. In a weighing machine, in combination, a beam, a poise, means for advancing said poise along said beam, means, controlled by said beam adapted automatically to lock the beam when the same reaches a position of balance, means adjacent the fulcrum of said beam for preventing dislocation of the latter during the intervals between weighing operations and means manually operative for rendering ineffective said last means and said locking means.

47. In a weighing machine, in combination, a beam, a poise, means for advancing said poise along said beam, means controlled by said beam adapted automatically to lock the beam, when the same reaches a position of balance, means adjacent the fulcrum of said beam for preventing dislocation of the latter during the intervals between weighing operations and means comprising a single handle, manually operative, for rendering ineffective said last means and said locking means.

48. In a weighing machine, the combination of a tilting beam, a poise thereon, means for feeding said poise beyond balance to cause the beam to swing to an extreme position, and means for reversing the operation of said poise when the beam reaches the said position and for slowing down the speed of the poise prior to the movement of the beam from the said extreme position.

49. In a weighing machine the combination of a tilting beam, a poise thereon, motor means for feeding said poise beyond the balance to cause the beam to swing to an extreme position, and means operative when the beam reaches said position to reverse the direction of feed of the poise and thereafter maintain the reverse direction of feed at a reduced speed until the beam moves from its extreme position to assume a position of final balance.

In testimony whereof we have signed our names to this specification in the presence of two subscribing witnesses.

FRANK A. EMERY.
ARTHUR A. ADAMS.

Witnesses:
WILLIAM E. CLAPP,
LOUIS L. G. DE ROCHEMONT.